Jan. 26, 1932.  J. T. HANNON ET AL  1,842,751
MECHANICAL FISH BAIT
Filed Feb. 5, 1931
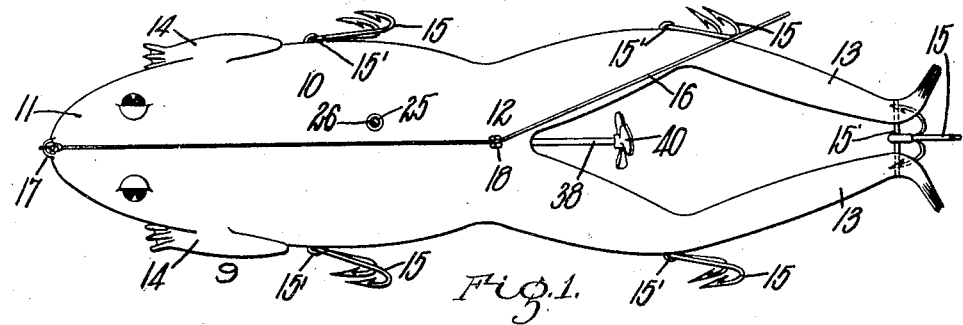
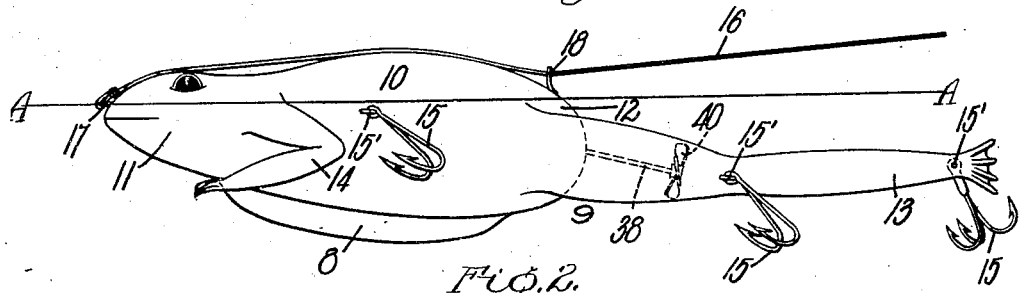
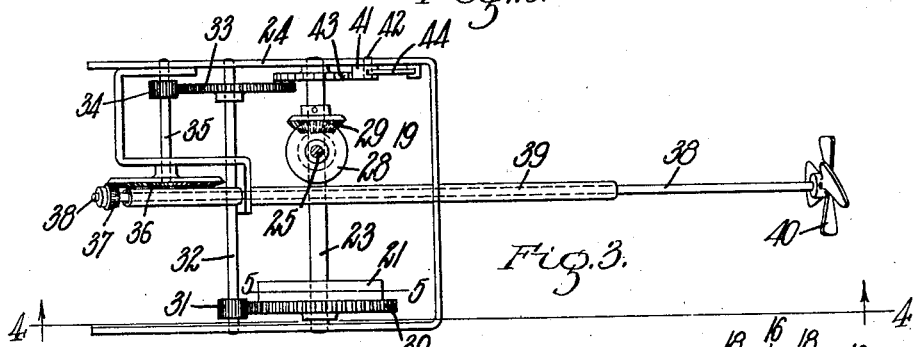
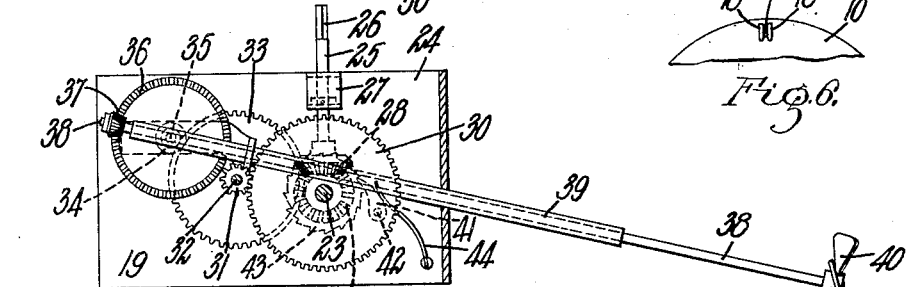
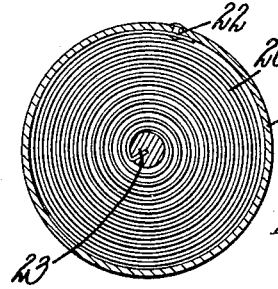
Inventors:
John T. Hannon,
Alexandre Beauregard,
by
Charles L. Gooding, Att'y.

Patented Jan. 26, 1932

1,842,751

UNITED STATES PATENT OFFICE

JOHN T. HANNON, OF NATICK, AND ALEXANDRE BEAUREGARD, OF HOLYOKE, MASSACHUSETTS

MECHANICAL FISH BAIT

Application filed February 5, 1931. Serial No. 513,595.

This invention relates to a bait for fish, the object of the invention being to provide a bait which is provided with mechanism for moving the bait through the water, thus attracting the attention of the fish and simulating a live bait. The bait has a hook or hooks attached thereto and a line whereby it may be controlled.

The bait illustrated in the drawings simulates a frog, but it is to be understood that the bait may be of any desired form.

The invention consists in a mechanical fish bait of the character set forth in the following specification and particularly pointed out in the claims.

Referring to the drawings:

Fig. 1 is a plan view of a mechanical fish bait simulating a frog and embodying our invention.

Fig. 2 is a side elevation of the same.

Fig. 3 is an enlarged plan view of the mechanism whereby the bait is driven through the water.

Fig. 4 is a sectional elevation taken on line 4—4, Fig. 3.

Fig. 5 is a transverse section through the spring drum taken on line 5—5, Fig. 3.

Fig. 6 is a detail elevation of a portion of the frog body illustrating the yielding means which engage the line.

Like numerals refer to like parts in the several views of the drawings.

In the drawings, 9 is a fish bait simulating a frog and embodying a body portion 10, a front end portion or head 11, a rear body portion 12, hind legs 13 and front legs 14. A keel 8 projects downwardly from the under side of the body portion 9 and extends longitudinally for a portion of the length of said body. The entire float, that is, the body portion, keel, front and rear portions, and legs are made of rubber.

Hooks 15 are pivotally attached at 15′ to different portions of the frog and a fishing line 16 is fastened to an eye 17 at the front end of the head portion of the frog, the said line passing rearwardly along the top of the body portion of the frog and between a pair of spring fingers 18, the line running from the spring fingers 18 to the fish pole which is held and manipulated by the fisherman.

The bait, in this instance a simulation of a frog, has positioned within the body portion thereof a mechanism 19 consisting of a spiral spring 20 enclosed within a drum 21, one end of the spring being fast to the drum at 22, the other end of the spring fast to a shaft 23. The shaft 23 is rotatably mounted at its opposite ends in a casing 24 which is positioned within the body portion 10 and said shaft is rotated to wind up the spring 20 by a vertical shaft 25, the upper end of which is squared at 26 to receive a key and terminates adjacent the top of the body portion 10. The winding shaft 25 is rotatably mounted in a bearing bracket 27 and has a bevel gear 28 fastened to its lower end which meshes into a bevel gear 29 fast to the shaft 23.

The drum 21 has a gear 30 fast thereto or integral therewith, which meshes into a pinion 31 fast to a shaft 32 which is rotatably mounted at its opposite ends in the casing 24 and has a gear 33 fast thereto which meshes into a pinion 34 fast to a shaft 35 which is rotatably mounted at its opposite ends in the casing 24 and has a gear 33 fast thereto which meshes with a pinion 34 fast to a shaft 35 which is also rotatably mounted upon the casing 24 and has fastened to one end thereof a bevel gear 36 which meshes into a bevel pinion 37 fast to a propeller shaft 38. The propeller shaft 38 is rotatably mounted in a tube 39 supported upon the casing and extending at an angle downwardly and outside said casing and outside the rear of the body portion 10. The upper end of the tube 39 terminates above the water line A—A.

A propeller 40 is fastened to the outer end of the propeller shaft 38. A pawl 41 is pivotally mounted to a stud 42 on the casing 24 and held in engagement with a ratchet 43 fast to the shaft 23 by a spring 44, one end of which bears against the pawl 41, the other end of the spring being fastened to the casing 24.

The general operation of the device hereinbefore specifically described is as follows:—The spring 20 is wound up by a suitable key through the shaft 25, gears 28 and 29 and shaft 23. Upon being placed in the water and released the propeller 40 is rotated by the spring 20 through the gearing hereinbefore described, whereby the pinion 37 is rotated and thus a rotary motion is imparted to the propeller shaft 38 and propeller 40. The fish line 16 is fastened to the eye 17 and passing over the back of the frog passes between the spring fingers 18, so that the fisherman by manipulating the rod and line can steer the frog in any desired direction and when a fish strikes the bait, the line can be yanked from between the spring fingers 18 and the fish brought in in the usual manner. The propeller 40 being positioned between the hind legs 13 of the frog is protected from injury or from becoming entangled in weeds, eelgrass and the like.

We claim:

1. A mechanical fish bait having, in combination, a float, a propeller shaft projecting therefrom, a propeller on the outer end of said shaft, mechanism within said float adapted to impart a rotary motion to said propeller, and a tube surrounding said shaft projecting from the outside into the interior of said float at an angle and terminating in the said interior above the level of the water in which said float is positioned, and fish hooks attached to said float.

2. A mechanical fish bait having, in combination, a float, a propeller shaft projecting therefrom, a propeller on the outer end of said shaft, mechanism within said float adapted to impart a rotary motion to said propeller, a fish hook attached to said float, means to attach a line to the front end of said float, and a pair of spring fingers spaced apart from said first-named means toward the rear and on top of said float and adapted to detachably hold said line therebetween.

In testimony whereof we have hereunto set our hands.

JOHN T. HANNON.
ALEXANDRE BEAUREGARD.